United States Patent [19]

Ellis et al.

[11] 3,737,668

[45] June 5, 1973

[54] KEYBOARD

[75] Inventors: Alfred Brian Edwin Ellis; Geoffrey Vernon Bunton, both of Chelmsford, England

[73] Assignee: The Marconi Company Limited, London, England

[22] Filed: July 23, 1971

[21] Appl. No.: 165,092

[30] Foreign Application Priority Data

July 30, 1970 Great Britain....................36,971/70

[52] U.S. Cl................250/220 R, 250/221, 250/229, 340/365 P

[51] Int. Cl........G06m 7/00, G08c 1/00, H01j 39/12

[58] Field of Search......................250/221, 229, 209, 250/220; 340/365 R, 365 P

[56] References Cited

UNITED STATES PATENTS

| | | | |
|---|---|---|---|
| 2,228,780 | 1/1941 | Roberts | 250/221 |
| 2,618,338 | 11/1952 | Bennes | 340/365 X |
| 3,011,379 | 12/1961 | Corwin | 250/229 X |
| 3,056,030 | 9/1962 | Kelchner | 250/221 X |

*Primary Examiner*—James W. Lawrence
*Assistant Examiner*—T. N. Grigsby
*Attorney*—Donald M. Wight, Charles E. Brown and Vincent L. Ramik

[57] ABSTRACT

The invention provides a control system for supplying instructions to a computer or the like. An opaque panel has several transparent areas. A number of conductors are provided, which pass under each of the opaque areas in turn, and at each of these areas there are photo-sensitive elements associated with a unique selection of the number of conductors. When the light passing through a transparent area varies the response of the photo-sensitive elements is such that signals are provided on the unique selection of conductors associated with that area.

9 Claims, 18 Drawing Figures

INVENTORS
Alfred Brian Edwin Ellis
and
Geoffrey Vernon Bunton
BY Baldwin Wight & Brown ATTORNEYS

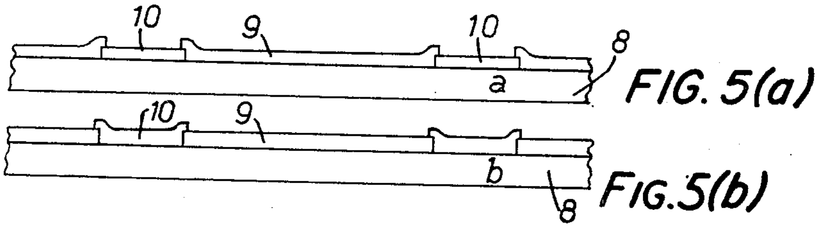
FIG. 5(a) FIG. 5(b)
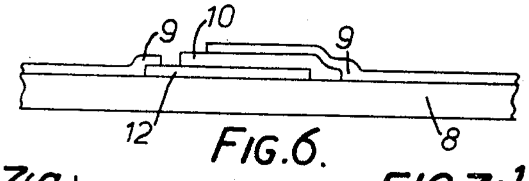
FIG. 6.
FIG. 7(a.)
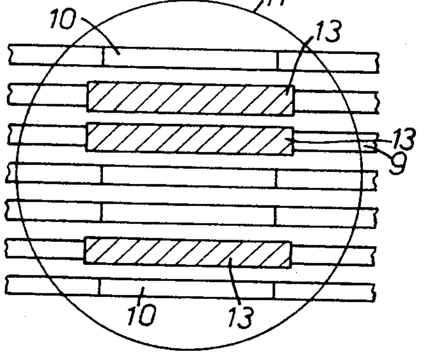
FIG. 7(b.)
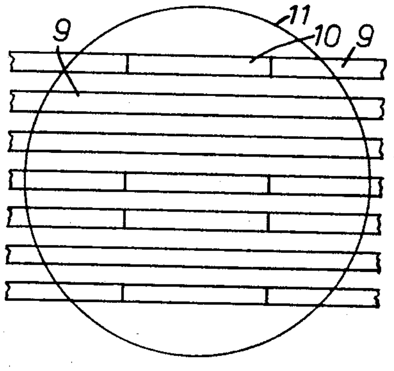
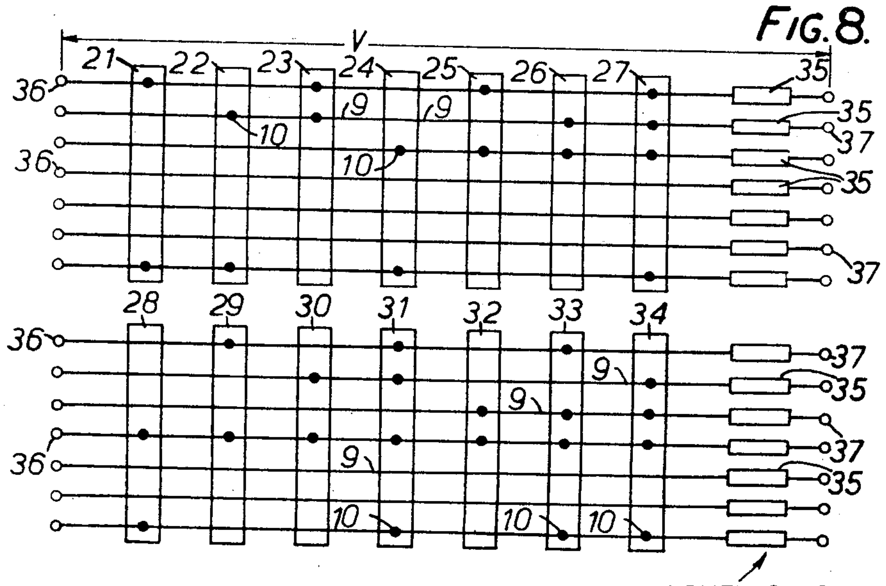
FIG. 8.
INVENTORS
Alfred Brian Edwin Ellis
and
Geoffrey Vernon Bunton
BY Baldwin Wight & Brown ATTORNEYS INVENTORS
Alfred Brian Edwin Ellis
and
Geoffrey Vernon Bunton
BY Baldwin Wight & Brown ATTORNEYS INVENTORS
Alfred Brian Edwin Ellis
and
Geoffrey Vernon Bunton
BY Baldwin Wight & Brown ATTORNEYS

KEYBOARD

This invention relates to control systems and more particularly to control systems suitable for controlling computers and the like in which an operator is required to supply instructions or data to a computer.

One such control system is described in the copending Patent Application of Dennis William George Byatt, Ser. No. 91,924 filed Nov. 23, 1970, now abandoned. The control system described in the Specification accompanying the above Patent Application comprises an opaque panel having a plurality of transparent areas therein; a plurality of photo-sensitive elements, each of said elements being associated with one of said areas, so that light can pass through said areas and fall on said elements; and an array of conductors, each associated with a different plurality of said elements and each element associated with a different pair of said conductors so that when the light falling on an element has an intensity substantially different from that of the light falling on the other elements a signal will be present on its associated pair of conductors.

A disadvantage experienced with the above system is that the output signal is present on a pair of conductors. A different pair of conductors is associated with each transparent area of the panel, and so in order to determine which transparent area has light of a different intensity associated with it, and so to determine the instruction to the computer, the outputs on all the conductors forming the array must be sampled until the two signal bearing conductors have been isolated.

The present invention seeks to provide an improved control system overcoming the above disadvantage.

According to this invention a control system comprises an opaque panel having a plurality of transparent areas therein; a plurality ($n$) of conductors associated with each one of said plurality of transparent areas; and a number, not exceeding $n$, of photo-sensitive elements associated with each of said transparent areas, each of said photo-sensitive elements being associated with a different one of said conductors so that when the light passing through one of said transparent areas has an intensity substantially different from that of the light passing through the other areas a signal may be derived from one or more of said conductors, the arrangement of the photosensitive elements being such that the combination of conductors from which signals may be derived depends upon which transparent area has light passing therethrough of an intensity substantially different from that of the light passing through the other areas, each area producing an individual combination.

There are many different ways in which the conductors and the photo-sensitive elements can be arranged. In one way each of the conductors may be interrupted at a transparent area and each of the photo-sensitive elements is connected so as to bridge an interruption in a conductor.

In another way each of the conductors is associated with a photo-sensitive element at each of the transparent areas and a different selected photo-sensitive element or combination of photo-sensitive elements is rendered inoperative (e.g. by short circuiting) at each of said areas.

In yet another way the conductors associated with each of the transparent areas are arranged in pairs and each photo-sensitive element is arranged to interconnect two conductors forming a pair.

In another arrangement a further conductor is associated with each transparent area, the photo-sensitive elements each being arranged to connect a different one of the conductors to said further conductor.

Finally, in yet another arrangement, the conductors associated with each of the transparent areas are connected to a common conductive layer by the photo-sensitive elements.

Preferably the conductors and photo-sensitive elements are formed on a substrate.

As will be apparent the nature of the photo-sensitive elements used must be chosen to suit their arrangement in relation to the conductors. In some embodiments the photo-sensitive elements will be photo-conductive or photo-resistive elements, in others they will be elements of the type adapted to produce an electrical voltage when illuminated.

Preferably, where the conductors and the photo-sensitive elements are formed on a substrate, siad conductors are of indium or aluminium and said photo-sensitive elements are of cadmium-sulphide doped with copper and chlorine.

Preferably amplifier means are provided for utilising signals developed in the conductors.

One embodiment in which the conductors associated with each of the transparent areas are connected to a common conductive layer by the photo-sensitive elements includes a substrtte assembly comprising a transparent substrate, a transparent conductive layer deposited on said substrate, an insulating layer deposited on said conductive layer, photo-sensitive elements inserted in apertures in said insulating layer, and conductive strips deposited on top of said insulating layer so as to by-pass selected photo-conductive elements. Preferably said transparent conductive layer is formed of tin oxide or thin gold.

Another embodiment in which the conductors associated with each of the transparent areas are connected to a common conductive layer by the photo-sensitive elements includes a substrate assembly comprising a transparent substrate, a first conductor deposited on said substrate and a plurality of conductors also deposited on said substrate, the first conductor being arranged to pass under the plurality of conductors, and being separated from each of the plurality of conductors by either a photo-sensitive element or an insulating element, said first conductor being transparent at least in the regions where it is covered by a photo-sensitive element.

Preferably said first conductor is formed of tin oxide or alternatively of gold having a thin region where the conductor is covered by a photo-sensitive element.

The invention is illustrated in the accompanying drawing in which.

FIGS. 5*a* and 5*b* show two ways of providing photo-sensitive elements in interruptions in the conductors.

FIG. 6 is a diagrammatic sectional view, showing another way of arranging conductors and photo-sensitive elements on a substrate.

FIGS. 7*a* and 7*b* are again diagrammatic top views showing two ways of arranging conductors and photo-sensitive elements on a substrate.

FIG. 8 is a circuit diagram of one form of control board which can be used in carrying out the present invention.

Figures 9, 10:
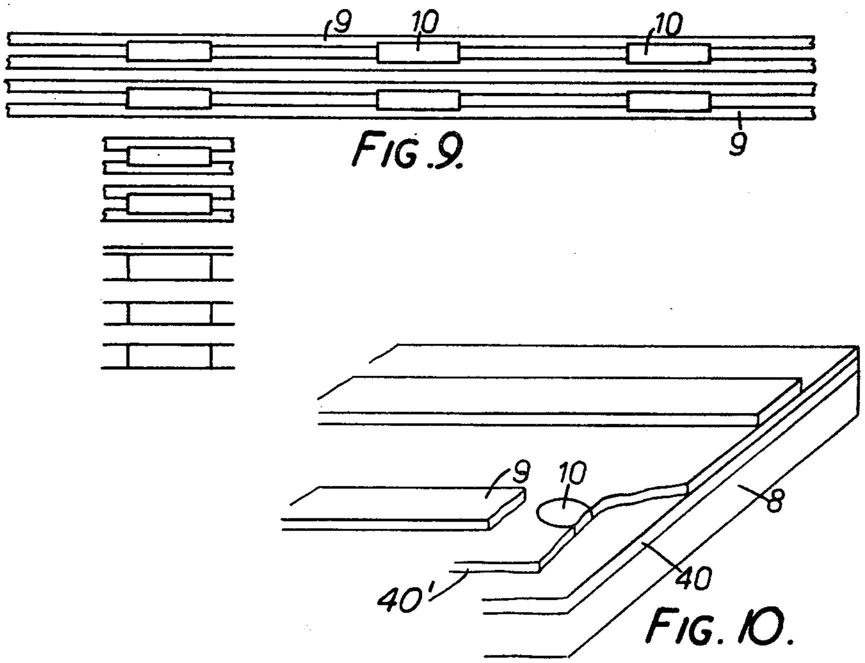

FIGS. 9 and 10 are two more figures showing arrangements of conductors and photo-sensitive elements on a substrate.

Figure 11A:
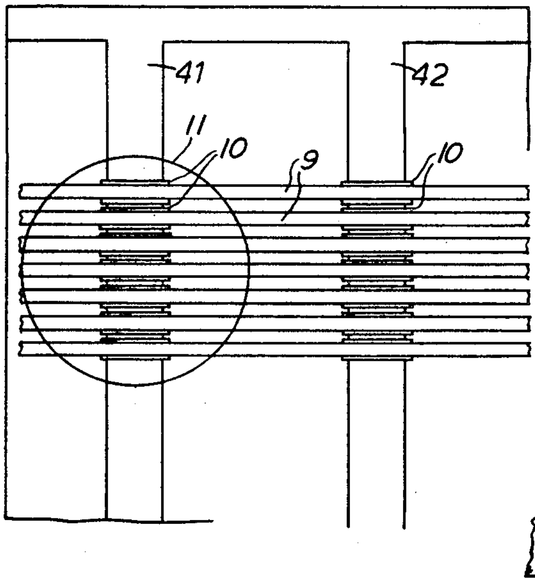
Figure 11B:
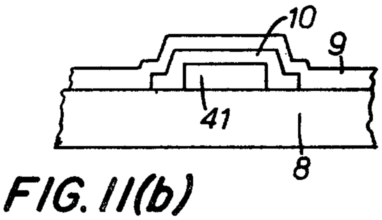

FIGS. 11*a* and 11*b* are mutally perpendicular diagrammatic views showing a further arrangement of conductors and photo-sensitive elements on a substrate.

Figure 12A:
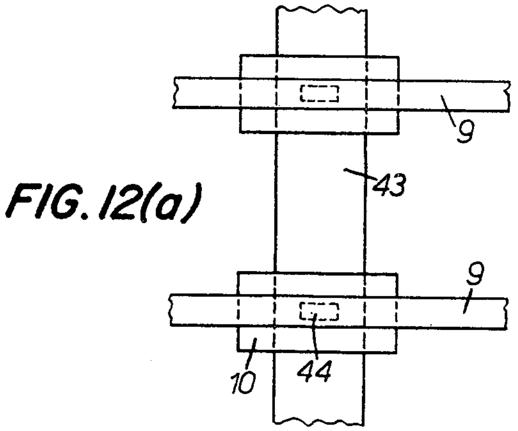
Figure 12B:
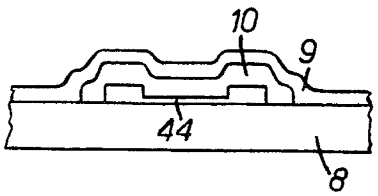

FIGS. 12*a* and 12*b* are mutually perpendicular views showing another arrangement of conductors and photo-sensitive elements on a substrate.

Figures 13, 14:
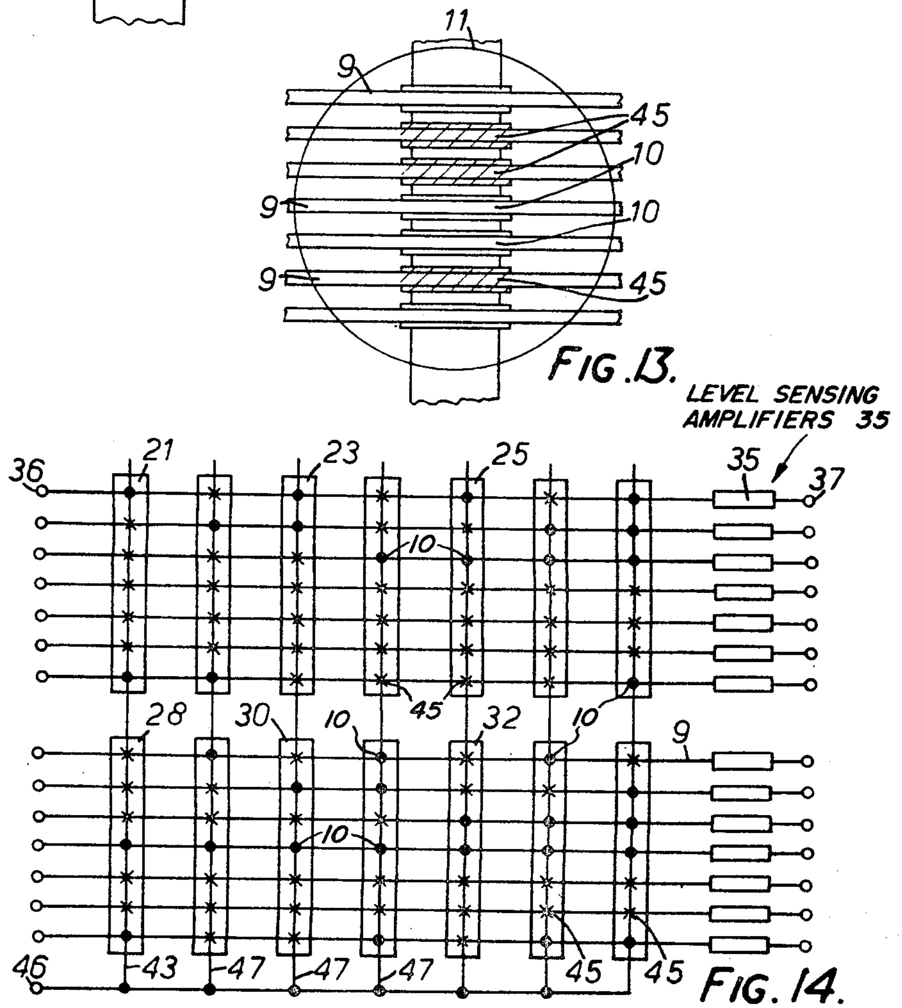

FIG. 13 is a diagrammatic top view also showing an arrangement of conductors and photo-sensitive elements on a substrate, and FIG. 14 shows another circuit diagram for a control board which can be used in carrying out the present invention.

Figure 1:
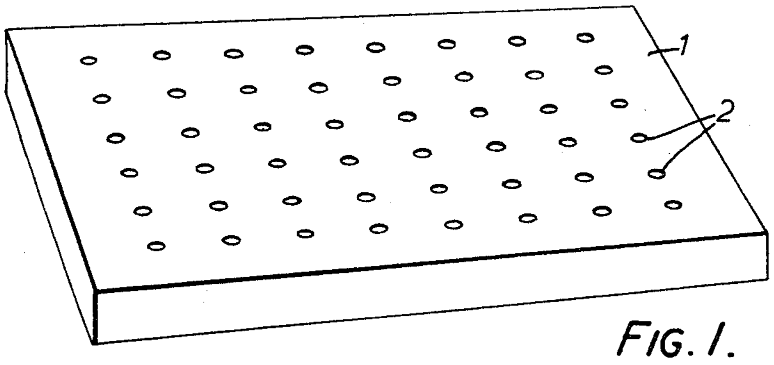
FIG. 1 is an external perspective view of a control system in accordance with this invention showing a convenient arrangement of transparent areas in an opaque panel. This embodiment can be operated merely by placing a finger over a selected area.

The external general perspective view of FIG. 1 shows a control board comprising an opaque cover 1 having a plurality of transparent areas 2. In operation of this control board an operator simply places a finger over a selected one of the transparent areas, thereby preventing ambient light from falling on photo-sensitive elements (not shown) mounted under transparent areas.

Figure 2:
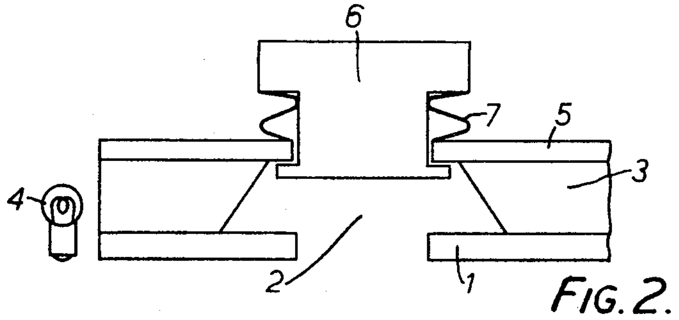
FIG. 2 is a diagrammatic sectional view showing part of an embodiment which can be operated by pressing a selected one of a number of buttons.
Figure 3:
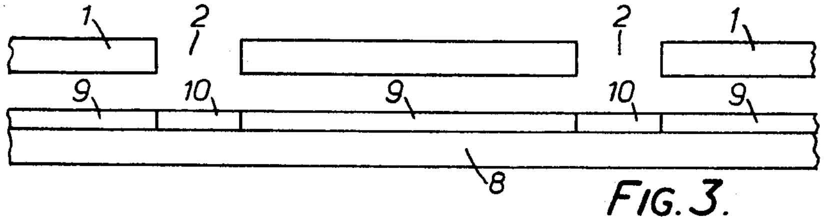
FIG. 3 is a diagrammatic sectional view of a portion of an embodiment employing conductors and photo-sensitive elements on a substrate.

FIG. 2 shows a portion of a modified and preferred arrangement. Here an opaque cover 1 has transparent areas 2. Mounted on top of the opaque cover is a layer of translucent material 3 (e.g. of perspex) which is edge lighted by lamps 4 (only one of which is shown) mounted at the edge so that light passes to the transparent areas such as 2. The translucent layer 3 is apertured so as not to extend over the transparent area 2. A further opaque layer 5 is mounted on top of the translucent layer 3, and this further opaque layer 5 is correspondingly apertured, a button 6, upwardly biassed by a spring7 being provided in each aperture in the opaque layer 5. When a button is in the position illustrated light from a lamp 4 can reach the area 2 underneath it. The edges of the holes in the translucent layer 3 are tapered as shown to facilitate light entering the holes in the cover 1. When a button is pushed down it closes the appropriate hole in the opaque cover 1, thereby preventing light from entering the appropriate transparent area 2. The arrangement of FIG. 2 has the advantage over that of FIG. 1 that the activation of the photo-sensitive elements (not shown) under the areas 2 is not dependent on or, from the practical point of view, affected by ambient lighting conditions FIG. 3 shows a portion of an arrangement in which conductors and photo-sensitive elements are on a substrate. The opaque cover 1 with transparent areas 2 (this may be as in FIG. 1 or as in FIG. 2) is mounted over an insulating substrate 8. Deposited on the substrate 8 is a plurality of conductors 9, only one of which is shown in FIG. 3. The conductors 9 are preferably of indium or aluminium and are formed by vapour deposition in vacuo. Under each of the transparent areas 2 of the opaque cover 1 is a photo-sensitive device 10, which is preferably made of cadmium sulphide doped with chlorine and copper, connected in series in the run of conductor 9, which is interrupted where a photo-sensitive device 10 is inserted.

Figure 4:
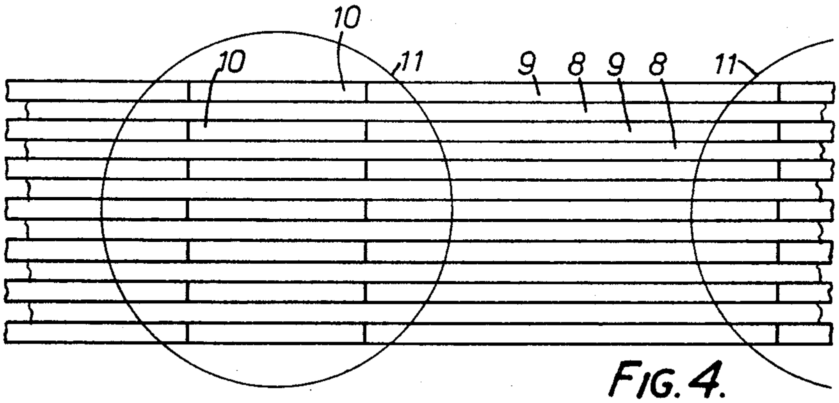
FIG. 4 is a diagrammatic top view of a portion of the arrangement of FIG. 3.

FIG. 4 is a top view of the arrangement of FIG. 3, with the opaque cover 1 removed. The circles 11 indicate the position of transparent areas 2 when the cover 1 is in position. The conductors 9 are formed on the substrate 8. In the illustrated example there are seven parallel conductors, passing under the transparent areas 2 shown. The sensitive elements 10 inserted in the interrupted conductors are under the areas 2.

FIGS. 5*a* and 5*b* show two ways of providing photo-sensitive elements inserted in the run of a conductor on a substrate 8. In FIG. 5*a* the photo-sensitive elements 10 are first formed on the substrate 8 and then the conductors 9 are depositied so that they slightly overlap the photo-sensitive elements. In FIG. 5*b* the conductors 9 are formed first, and then the photo-sensitive elements 10 are formed and slightly overlap the conductors 9.

FIG. 6 shows a different arrangement. Here the substrate 8 is transparent. A transparent conductor 12, constituted, for example, by a thin deposit of tin oxide or a thin layer of gold, is deposited on the substrate and then a photo-sensitive element 10 shaped as illustrated, is formed. After this the conductors 9 are deposited so that, on one side of the interruption in a conductor 9 it overlaps slightly a conductor 12 and on the other side of said interruption conductor 9 overlaps a substantial portion of the element 10. An arrangement as shown in FIG. 6 is mounted under the opaque cover 1 (not shown in FIG. 6) with the substrate uppermost (i.e. nearest the cover) with the elements 10, of course, under the transparent areas 2 so that light passing through a transparent area 2 in the cover 1 will pass through the substrate 8 and the transparent conductor 12 before reaching a photo-sensitive element 10.

FIGS. 7*a* and *b* show two different detail arrangements which could be used in an arrangement as generally shown in FIG. 4. In this FIG. 4 seven photo-sensitive devices are shown under each of the transparent areas 2 in the opaque panel 1, each device being in series in the run of a different interrupted conductor 9. As will be obvious, if the intensity of the light passing through one of the transparent areas is altered the resistance of each of the photo-sensitive elements under that area will also alter. In FIG. 7*a* three conductive strips 13 each deposited on top of a different one of three of the photo-sensitive elements, are shown, thereby shorting out these three. In FIG. 7*b* only four of the conductors 9 are interrupted under the particular area shown and have photo-sensitive elements in the interruptions. In both these arrangements only four of the conductors (those having inserted devices 10) will be altered in overall resistance by variation of the light passing through an area 2 in question - as illustrated the first, fourth, fifth and seventh conductors, counting upwards in FIGS. 7*a* and 7*b*. By providing (in FIG. 7*a*) a different combination of conductive strips 13 under each transparent area, or (in FIG.7*b*) by providing a different combination of inserted elements 10 under each transparent area,it is possible to determine which transparent area has been covered by sensing the outputs derived from the seven conductors.

FIG. 8 is a circuit diagram. The areas 21, 22, 23 .... 34 correspond to the transparent areas 2 in the opaque cover 1, and the presence of an effective photo-sensitive element 10 (i.e. a photo-sensitive element which is not shorted out as in FIG. 7*a* by a conductive strip 13) is indicated by a dot. It will be seen that a different combination of effective photo-sensitive devices is provided at each transparent area. Each conductor 9 is connected to a level sensing amplifier 35. In operation a potential is applied to input terminals 36, and output signals are derived from output terminals 37. When the intensity of the light passing through one of the transparent areas 2 of the opaque cover 1 varies the resistance of a particular combination of photo-sensitive elements will vary and a unique combination of output signals will be present on the output terminals.

FIG. 9 shows an alternative arrangement of the substrate type. Here the conductors 9 are in pairs, with each photo-sensitive device arranged to connect the two conductors of a pair. The photo-sensitive devices have a low resistance when illuminated typically of the order of 1 MΩ and a high resistance, typically of the order of $10^3$ MΩ when not illuminated. Thus the resistance across the output terminals of each pair of conductors will alter appreciably if a photo-sensitive device between them is illuminated or darkened.

FIG. 10 shows yet another arrangement of the substrate type. Here the substrate 8 is transparent and is coated with a transparent conductive layer 40, e.g. of tin oxide or thin gold. Over this layer is an insulating coating layer 40' having the strip conductors 9 deposited thereon. Certain selected areas of the insulating layer lying under the conductors 9 are made of photo-sensitive material.

In operation the arrangement of FIG. 10 is mounted with the substrate 8 uppermost i.e. closest to the transparent areas 2 in the opaque cover 1 so that light shining through a transparent area passes through the substrate 8 and the conducting transparent layer 40 before affecting a photo-conductive device 10. When the photo conductive device 10 is activated it connects the strip conductor 9 to the transparent conducting layer 40.

FIGS. 11*a* and *b* show yet another arrangement. Here, instead of the transparent conductive layer 40 of FIG. 10 there is a series of transparent conducting fingers 41, 42, e.g. of the tin oxide or thin gold. Photo-sensitive elements 10 are so situated as to separate the transparent fingers from the strip conductors 9.

FIG. 12 shows a somewhat similar arrangement. Referring to FIG. 12, 43 represents a finger made of non-transparent material for most of its length. However, in each region 44 where a finger 43 is to be crossed by a strip conductor 9 said finger is made thin enough for light to be able to pass through it. A suitable material for these fingers is gold. Here again photo-sensitive elements 10 separate the fingers 43 from the strip conductors 9.

With the arrangements of FIGS. 11*a*, 11*b* and 12 the substrates are mounted uppermost so as to be closest to the opaque cover 1. Light passing through the transparent areas 2 in the opaque cover will pass therefore through the substrate before affecting the photo-sensitive devices.

FIG. 13 shows more fully an arrangement of the nature of that illustrated in FIG. 11. Here three of the photo-sensitive devices are replaced y insulators 45 preferably of silicon oxide. Thus the four conductors 9 which are associated with photo-sensitive elements 10 will produce changed output signals in response to changes in the intensity of light falling on the substrate. Again if a different combination of effective photo-sensitive devices is associated with each transparent area of the opaque cover it is possible to determine in which transparent area a light change has occurred by sensing the oututs derived from the seven conductors.

Any of the arrangements illustrated in FIGS. 9, 10, 11 and 12 could be adapted in a similar manner by replacing some of the photo-sensitive elements by insulating elements and thus obtaining an identifying combination of signals for each transparent area. FIG. 14 shows a circuit diagram for such an arrangement. In FIG. 14 the different areas 21 .... 34 correspond with the different transparent areas 2 in the opaque cover 1, and the presence of an effective photo-sensitive element 10 is indicated by a dot 10, insulating element being indicated by crosses 45. Input signals are applied between input terminals 36 and a common terminal 46 which is connected to leads 47, which corresponds with the layer 40 of FIG. 10, the leads 41, 42 of FIG. 11 or the lead 43 of FIG. 12. The conductors 9 are connected to level sensing amplifiers 35, to give output signals on output terminals 37.

By suitably arranging the positioning of the effective photo-sensitive devices it is possible with seven conductors under each area 2, to obtain output signals in accordance with a 7-bit binary code and suitable for feeding directly to a computer or similar device. There are known 7-bit binary codes representative of the letters of the alphabet and the digits 0 – 9, and a control board in accordance with this present invention could easily be designed to operate in accordance with such a code.

I claim:

1. A keyboard for supplying instructions or data to a computer or the like said keyboard comprising an opaque panel having a plurality of transparent areas therein; a substrate; a plurality (*n*) of conductors formed on said substrate and having portions exposed to each one of said plurality of transparent areas whereby all of said conductors may be illuminated at each of said areas; and a number, not exceeding (*n*), of photo-sensitive elements formed on said substrate and associated with each of said transparent areas, each of said photo-sensitive elements being connected to selected ones of said conductors at each area so that the combination of conductors connected to photo-sensitive elements at each area are characteristic of that area whereby variation of the light passing through any one of the transparent areas enables a code combination of signals, characteristic of that transparent area, to be derived from the plurality of conductors.

2. A keyboard as claimed in claim 1 wherein the conductors are arranged in pairs, and each photo-sensitive element is arranged to interconnect two conductors forming a pair.

3. A keyboard as claimed in claim 1 and which includes a substrate assembly comprising a transparent substrate, a transparent conductive layer deposited on said substrate, an insulating layer deposited on said conducting layer, photo-sensitive elements inserted in apertures in said insulating layer, and conductive strips deposited on top of said insulating layer so as to by-pass selected photo-conductive elements.

4. A system as claimed in claim 1 and which includes a substrate assembly comprising a transparent substrate, a first conductor deposited on said substrate and a plurality of conductors also deposited on said substrate, the first conductor being arranged to pass under the plurality of conductors, and being separated from each of the plurality of conductors by either a photo-sensitive element or an insulating element, said first conductor being transparent at least in the regions where it is covered by a photo-sensitive element.

5. A keyboard as claimed in claim 1 wherein each of the conductors is interrupted at a transparent area and each of the photo-sensitive elements is connected so as to bridge an interruption in a conductor.

6. A keyboard as claimed in claim 5 wherein all the conductors are interrupted and bridged with a photo-sensitive element at each of the transparent areas and including means for shunting a different combination of photo-sensitive elements at each of said areas.

7. A keyboard as claimed in claim 1 including a further conductor and in which each photo-sensitiveelement is arranged to connect said further conductorwith a respective one of the conductors in the said plurality of conductors.

8. A keyboard as claimed in claim 7, wherein said further conductor is a common conductive layer connected to the plurality of conductors by the photo-sensitive elements.

9. A keyboard control system for supplying instructions or data to a computer or the like, photo-sensitive element in combination: conductor with a substrate;

conductor means formed on said substrate and defining a plurality of of input terminals for receiving an input potential and having a plurality of output terminals, said conductor means including a number of groups of photo-sensitive devices each group of which is located in a discrete area and a plurality of conductors connecting said input and said output terminals at least some of which conductors are connected through individual devices of said groups thereof between said input and said output terminals such that within each of said areas there is a different combination of said devices through which said conductors are connected to such terminals;

means for normally subjecting all of said areas to one level of illumination whereby a selected pattern of output potentials appears at said output terminals; and means for selectively subjecting each individual area to a level of illumination different from said one level whereby to alter said pattern of output potentials uniquely in accord with that different combination of said devices existing for each such individual area.

* * * * *